US012656805B2

(12) United States Patent
Hu

(10) Patent No.: US 12,656,805 B2
(45) Date of Patent: Jun. 16, 2026

(54) CURRENT MIRROR CIRCUIT

(71) Applicant: Socionext Inc., Kanagawa (JP)

(72) Inventor: Yishen Hu, Yokohama (JP)

(73) Assignee: Socionext Inc., Kanagawa (JP)

( * ) Notice: Subject to any disclaimer, the term of this patent is extended or adjusted under 35 U.S.C. 154(b) by 185 days.

(21) Appl. No.: 18/668,961

(22) Filed: May 20, 2024

(65) Prior Publication Data

US 2024/0310864 A1 Sep. 19, 2024

Related U.S. Application Data

(63) Continuation of application No. PCT/JP2021/044525, filed on Dec. 3, 2021.

(51) Int. Cl.
*G05F 3/26* (2006.01)

(52) U.S. Cl.
CPC .................................... *G05F 3/262* (2013.01)

(58) Field of Classification Search
CPC ................................... G05F 3/26; G05F 3/262
See application file for complete search history.

(56) References Cited

U.S. PATENT DOCUMENTS 5,708,606 A 1/1998 Tanzawa et al.
6,175,278 B1 1/2001 Hasegawa
6,265,859 B1 * 7/2001 Datar ...................... G05F 3/262 323/315
7,514,989 B1 * 4/2009 Somerville ............... G05F 3/26 327/543
9,065,462 B1 * 6/2015 Kakamu ............. H03M 1/1061
2006/0001481 A1 1/2006 Koizumi et al.
2008/0012630 A1 1/2008 Koizumi et al.
2020/0249710 A1 * 8/2020 Shiina ..................... G05F 1/575

FOREIGN PATENT DOCUMENTS

JP H08-065116 A 3/1996
JP H11-340760 A 12/1999
JP 2003-323145 A 11/2003
JP 2006-020098 A 1/2006

OTHER PUBLICATIONS

International Search Report dated Jan. 25, 2022 issued in International Patent Application No. PCT/JP2021/044525, with English translation.

* cited by examiner

*Primary Examiner* — Alex Torres-Rivera
(74) *Attorney, Agent, or Firm* — Rimon P.C.

(57) ABSTRACT

A current mirror circuit includes: a plurality of first transistors connected to a first power supply at their sources and to an input terminal at their gates and drains; and a second transistor connected to the first power supply at its source, to the input terminal at its gate, and to an output terminal at its drain. A switch circuit is provided between at least one of the first transistors and the input terminal. The switch circuit includes third and fourth transistors connected in series between the first transistor and the input terminal, an inverter circuit, and a fifth transistor connected between a middle node of the third and fourth transistors and an output terminal of the inverter circuit. A switch control signal is given to the gates of the third to fifth transistors and to the input of the inverter circuit.

4 Claims, 3 Drawing Sheets

CURRENT MIRROR CIRCUIT

CROSS-REFERENCE TO RELATED APPLICATIONS

This is a continuation of International Application No. PCT/JP2021/044525 filed on Dec. 3, 2021. The entire disclosure of this application is incorporated by reference herein.

BACKGROUND

The present disclosure relates to a current mirror circuit.

A current multiplying circuit using a current mirror circuit has been widely used. For example, Japanese Unexamined Patent Publication No. H11-340760 discloses a current-variable current mirror circuit in which the current ratio is variable.

The cited patent document discloses, for example, a binary-weighted current source having a plurality of transistors. In the cited patent document, switches are provided in series with the respective transistors, to control the current gain by controlling on/off of the switches.

In general, in a current-variable current mirror circuit, transistors of the same conductivity type as those of a current source (p-type or n-type transistors) are used as switches to enable/disable passing of a current.

There is a widely known problem that, with the recent shrinkage of semiconductor integrated circuits, the gate length of transistors has become smaller and this increases the off-time leak current of transistors. In a current-variable current mirror circuit, an error caused by an off-leak current flowing through a switch although the switch is off has become too great to neglect. In particular, in a binary-weighted current mirror circuit, when the number of switches turned off is large, or when a current branch on the secondary side having a large multiple number is turned off, the current error against the design value becomes great.

In view of the above problem, an objective of the present disclosure is preventing or reducing the error caused by an off-leak current of a transistor in a current-variable current mirror circuit.

SUMMARY

According to the first mode of the present disclosure, a current mirror circuit includes: an input terminal receiving an input current; an output terminal from which an output current is output; a plurality of first transistors of a first conductivity type, connected to a first power supply at their sources and to the input terminal at their gates and drains; and a second transistor of the first conductivity type, connected to the first power supply at its source, to the input terminal at its gate, and to the output terminal at its drain, wherein a switch circuit is provided between at least one of the plurality of first transistors and the input terminal, and the switch circuit includes a third transistor and a fourth transistor of the first conductivity type, connected in series between the drain of the first transistor and the input terminal, receiving a switch control signal for on/off control of the switch circuit at their gates, an inverter circuit receiving the switch control signal at its input terminal, and a fifth transistor of a second conductivity type, connected to an output terminal of the inverter circuit at one of its drain and source and to a middle node between the third transistor and the fourth transistor at the other, and receiving the switch control signal at its gate.

According to the second mode of the present disclosure, a current mirror circuit includes: an input terminal receiving an input current; an output terminal from which an output current is output; a first transistor of a first conductivity type, connected to a first power supply at its source and to the input terminal at its gate and drain; and a plurality of second transistors of the first conductivity type, connected to the first power supply at their sources, to the input terminal at their gates, and to the output terminal at their drains, wherein a switch circuit is provided between at least one of the plurality of second transistors and the output terminal, and the switch circuit includes a third transistor and a fourth transistor of the first conductivity type, connected in series between the drain of the second transistor and the output terminal, receiving a switch control signal for on/off control of the switch circuit at their gates, an inverter circuit receiving the switch control signal at its input terminal, and a fifth transistor of a second conductivity type, connected to a middle node between the third transistor and the fourth transistor at one of its drain and source and to an output terminal of the inverter circuit at the other, and receiving the switch control signal at its gate.

In the current mirror circuits of the first and second modes described above, when the switch circuit is turned on with the switch control signal, the fifth transistor is configured to become a deep reverse off state. Therefore, the off-leak current of the fifth transistor can be kept low.

Also, when the switch circuit is turned off with the switch control signal, the fourth transistor is configured to become a deep reverse off state. Therefore, the off-leak current of the fourth transistor can be kept low. Moreover, the off-leak current of the third transistor is configured to flow to a path different from the flow path of the input current. It is therefore possible to prevent or reduce the occurrence of an error caused by a leak current in the current ratio between the input current and the output current.

According to the present disclosure, in a current-variable current mirror circuit, the error caused by an off-leak current can be prevented or reduced.

DETAILED DESCRIPTION

Figure 1:
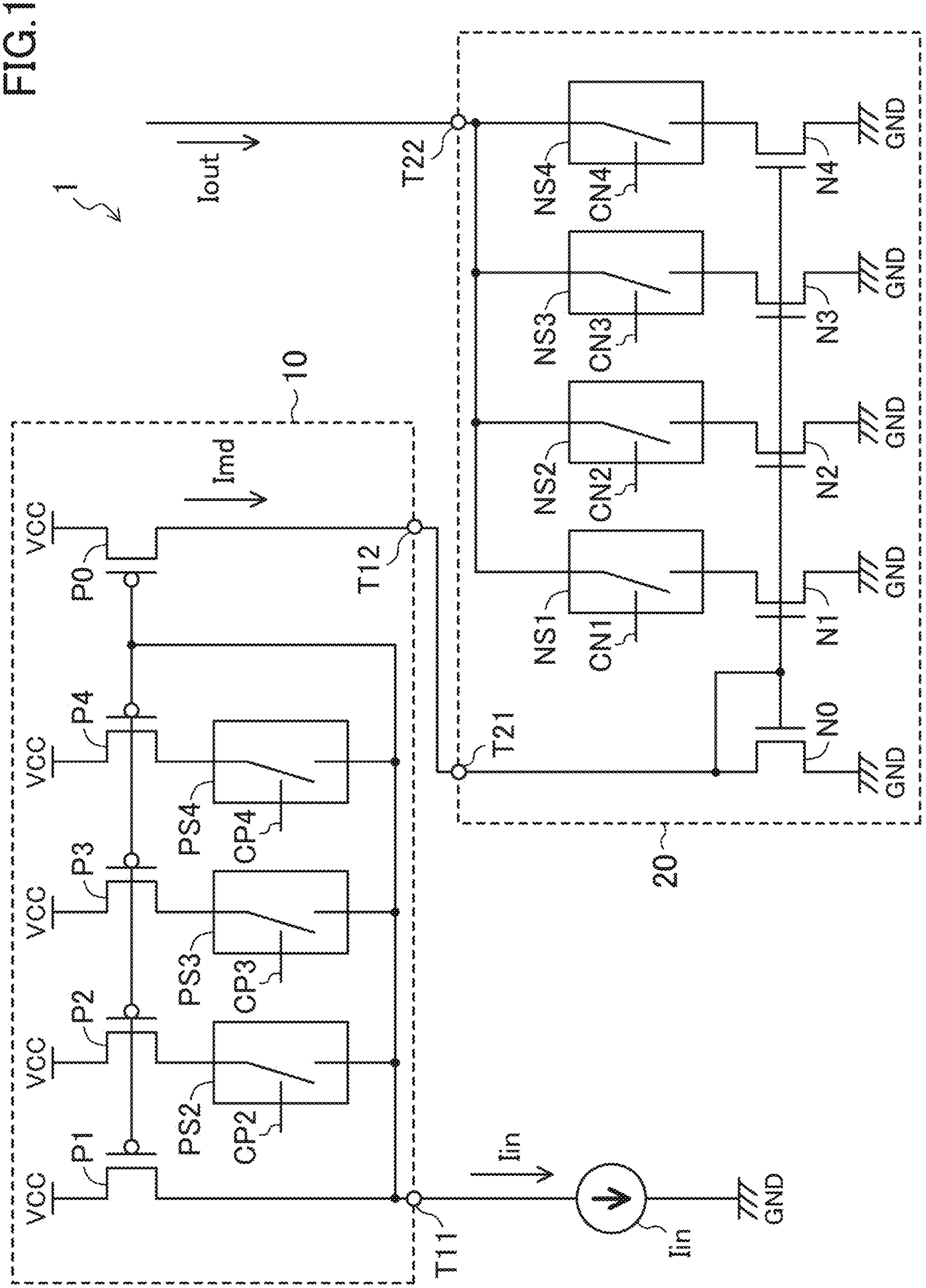
FIG. 1 is a circuit diagram showing a configuration example of a current mirror circuit according to an embodiment.

An embodiment of the present disclosure will be described hereinafter with reference to the accompanying drawings. Note that specific numeric values shown in the following embodiment are mere examples for easy understanding of the disclosure, and by no means intended to limit the scope of the disclosure. In the following description, a node in a circuit and a signal/current passing through the node may be denoted by the same reference character. Also, a power supply and the voltage of the power supply may be denoted by the same reference character.

(Current Mirror Circuit)

FIG. 1 shows a current mirror circuit 1 of a two-stage configuration as an example. Specifically, the current mirror circuit 1 includes: a first-stage first current mirror circuit 10 that generates a middle current Imd from an input current Iin; and a second-stage second current mirror circuit 20 that generates an output current Iout from the middle current Imd. The input current Iin is supplied from a current source Iin, for example.

Note that the configuration of the current mirror circuit 1 is not limited to the two-stage one. For example, the current mirror circuit 1 may have a one-stage configuration made of only the first current mirror circuit 10 or the second current mirror circuit 20. Otherwise, the current mirror circuit 1 may have a configuration of three or more stages with an additional current mirror circuit (not shown) provided before the first current mirror circuit 10 or after the second current mirror circuit 20.

—First Current Mirror Circuit—

The first current mirror circuit 10 includes: an input terminal T11 that receives the input current Iin; an output terminal T12 from which the middle current Imd as the output current is output; a plurality of p-type first transistors P; and a p-type second transistor P0. Note that, in the first current mirror circuit 10, the p-type corresponds to the first conductivity type and the n-type corresponds to the second conductivity type.

Also, in the first current mirror circuit 10, a switch circuit PS is provided between at least one of the plurality of first transistors P and the input terminal T11. Note that, in the present disclosure, a terminal refers to an inlet/outlet of a current for connecting electric circuits, and the concrete form and configuration of the terminal are not specifically limited. For example, as the terminal, a dedicated pad may be provided, or a connection node connecting elements may function as the terminal.

In the example of FIG. 1, four first transistors P1 to P4 are provided as the transistors P, and switch circuits PS2 to PS4 are provided between three transistors P2 to P4, out of the four transistors, and the input terminal T11, respectively.

Specifically, in this example, the first transistor P1 is connected to the power supply VCC at its source and to the input terminal T11 at its gate and drain. The first transistor P2 is connected to the power supply VCC at its source, to the input terminal T11 at its gate, and to the input terminal T11 at its drain through the switch circuit PS2. The first transistor P3 is connected to the power supply VCC at its source, to the input terminal T11 at its gate, and to the input terminal T11 at its drain through the switch circuit PS3. The first transistor P4 is connected to the power supply VCC at its source, to the input terminal T11 at its gate, and to the input terminal T11 at its drain through the switch circuit PS4. The number of the first transistors P and the number of the switch circuits PS may be different from each other as in FIG. 1, or may be the same. In other words, the switch circuit PS may just be provided so that on/off control can be made for at least one of the plurality of first transistors P. Note that, in the first current mirror circuit 10, the power supply VCC corresponds to the first power supply.

The second transistor P0 is connected to the power supply VCC at its source, to the input terminal T11 at its gate, and to the output terminal T12 at its drain.

The sizes of the first transistors P1 to P4 are set according to binary weighting, for example. For example, the size ratio among the gate width Pg0 of the second transistor P0, the gate width Pg1 of the first transistor P1, the gate width Pg2 of the first transistor P2, the gate width Pg3 of the first transistor P3, and the gate width Pg4 of the first transistor P4 is set to be Equation (1) below.

$$Pg0 : Pg1 : Pg2 : Pg3 : Pg4 = 1 : 1 : 2 : 4 : 8 \tag{1}$$

With the setting of the sizes (e.g., gate widths) of the first transistors P1 to P4 according to binary weighting as described above, the ratio in gate width between the input side and output side of the first current mirror circuit 10 can be changed by the on/off control with switch control signals CP. That is, in the first current mirror circuit 10, by the on/off control with switch control signals CP, equal-pitch and multi-stage stepped current setting is possible.

Specifically, the middle current Imd output from the first current mirror circuit 10 is expressed by Equation (2) below.

$$Imd = I\text{in} \times \frac{1}{\left(1 + \sum_{i=2}^{4}\left(PSi \times 2^{i-1}\right)\right)} \tag{2}$$

In Equation (2), PSi is “1” when the switch circuit PS2, PS3, PS4 is on, and “0” when it is off. Note that the ratio in gate width among the first transistors P1 to P4 is not limited to Equation (1) above, but may be any other given ratio.

<Switch Circuit>

Figure 2:
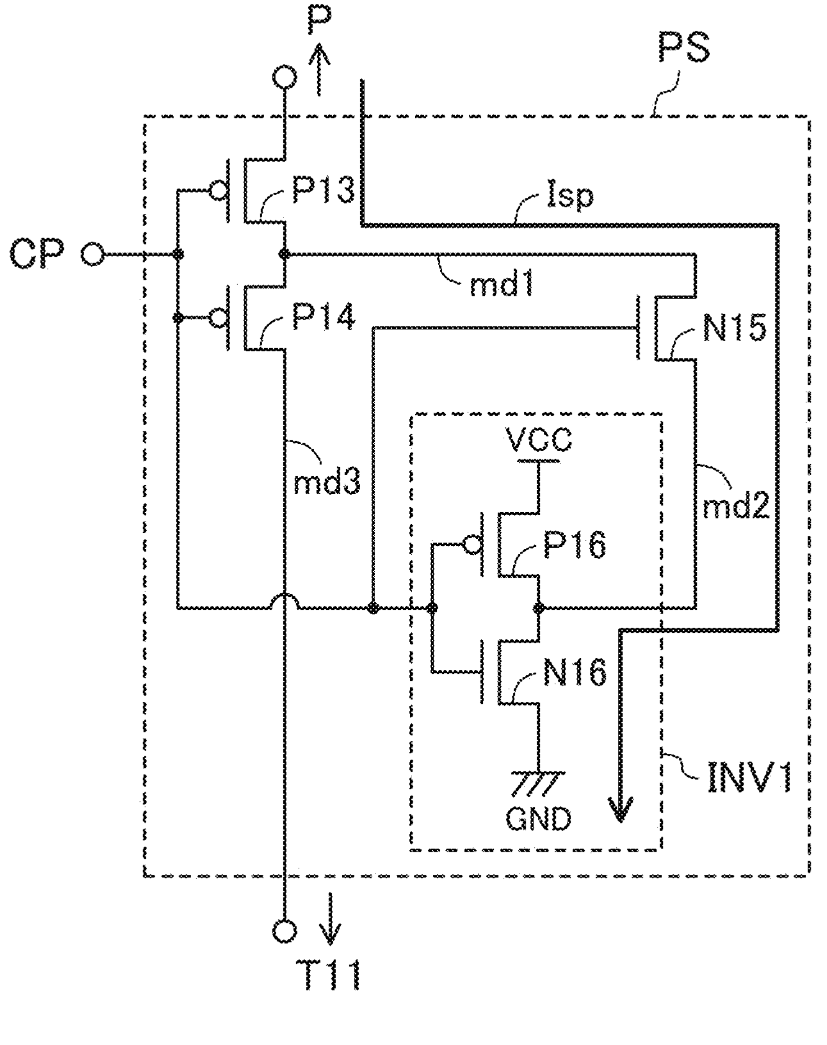
FIG. 2 is a circuit diagram showing a configuration example of a first switch circuit of a first current mirror circuit.

FIG. 2 is a circuit diagram showing a configuration example of a switch circuit PS, which can be used as the switch circuits PS2 to PS4 in FIG. 1. A switch control signal CP to control on/off of the switch circuit PS is given to the switch circuit PS.

To state specifically, as shown in FIG. 1, a switch control signal CP2 to control on/off of the switch circuit PS2 is given to the switch circuit PS2. Similarly, a switch control signal CP3 to control on/off of the switch circuit PS3 is given to the switch circuit PS3, and a switch control signal CP4 to control on/off of the switch circuit PS4 is given to the switch circuit PS4. Note that, in the following description with reference to FIG. 2, the switch circuit is denoted by its common reference character PS, the first transistor is denoted by its common reference character P, and the switch control signal is denoted by its common reference character CP, for convenience sake.

As shown in FIG. 2, the switch circuit PS includes a p-type third transistor P13, a p-type fourth transistor P14, an inverter circuit INV1, and an n-type fifth transistor N15.

The third transistor P13 and the fourth transistor P14 are connected in series between the drain of the first transistor P and the input terminal T11. Specifically, one of the source and drain of the third transistor P13 is connected to the first transistor P, and the other is connected to a middle node md1. One of the source and drain of the fourth transistor P14 is connected to the middle node md1, and the other is connected to the input terminal T11. The switch control signal CP is given to the gates of the third and fourth transistors P13 and P14.

The inverter circuit INV1 has a configuration of a p-type transistor P16 and an n-type transistor N16 connected in series between the power supply VCC and the ground GND. The switch control signal CP is given to the input terminal of the inverter circuit INV1. In other words, the switch control signal CP is given to the gates of the transistors P16 and N16.

One of the drain and source of the fifth transistor N15 is connected to the output terminal of the inverter circuit INV1, and the other is connected to the middle node md1. In other words, one of the drain and source of the fifth transistor N15 is connected to the drains of the transistors P16 and N16. The switch control signal CP is given to the gate of the fifth transistor N15.

—Second Current Mirror Circuit—

Referring back to FIG. 1, the second current mirror circuit 20 includes: an input terminal T21 that receives the middle current Imd as the input current; an output terminal T22 from which the output current Iout is output; an n-type first transistor NO; and a plurality of n-type second transistors N. Also, in the second current mirror circuit 20, a switch circuit NS is provided between at least one of the plurality of second transistors N and the output terminal T22. Note that, in the second current mirror circuit 20, the n-type corresponds to the first conductivity type and the p-type corresponds to the second conductivity type.

The first transistor NO is connected to the ground GND at its source, to the input terminal T21 at its gate and drain. In the second current mirror circuit 20, the ground GND corresponds to the first power supply.

In the example of FIG. 1, the second transistors N include four second transistors N1 to N4, and switch circuits NS1 to NS4 are provided between the second transistors N1 to N4, respectively, and the output terminal T22.

Specifically, in this example, the second transistor N1 is connected to the ground GND at its source, to the input terminal T21 at its gate, and to the output terminal T22 at its drain through the switch circuit NS1. The second transistor N2 is connected to the ground GND at its source, to the input terminal T21 at its gate, and to the output terminal T22 at its drain through the switch circuit NS2. The second transistor N3 is connected to the ground GND at its source, to the input terminal T21 at its gate, and to the output terminal T22 at its drain through the switch circuit NS3. The second transistor N4 is connected to the ground GND at its source, to the input terminal T21 at its gate, and to the output terminal T22 at its drain through the switch circuit NS4. The number of the second transistors N and the number of the switch circuits NS may be the same as in FIG. 1, or may be different from each other. In other words, the switch circuit NS may just be provided so that on/off control can be made for at least one of the plurality of second transistors N.

The sizes of the second transistors N1 to N4 are set according to binary weighting, for example. For example, the size ratio among the gate width Ng0 of the first transistor N0, the gate width Ng1 of the second transistor N1, the gate width Ng2 of the second transistor N2, the gate width Ng3 of the second transistor N3, and the gate width Ng4 of the second transistor N4 is set to be Equation (3) below.

$$Ng0:Ng1:Ng2:Ng3:Ng4=1:1:2:4:8 \quad (3)$$

With the setting of the sizes (e.g., gate widths) of the second transistors N1 to N4 according to binary weighting as described above, the ratio in gate width between the input side and output side of the second current mirror circuit 20 can be changed by the on/off control with switch control signals CN. That is, in the second current mirror circuit 20, by the on/off control with switch control signals CN, equal-pitch and multi-stage stepped current setting is possible.

Specifically, the output current Iout output from the second current mirror circuit 20 is expressed by Equation (4) below.

$$I\text{out}=Imd\times\sum_{j=1}^{4}\left(NSj\times 2^{j-1}\right)) \quad (4)$$

In Equation (4), NSj is "1" when the switch circuit NS1, NS2, NS3, NS4 is on, and "0" when it is off. Note that the ratio in gate width among the second transistors N1 to N4 is not limited to Equation (3) above, but may be any other given ratio.

<Switch Circuit>

Figure 3:
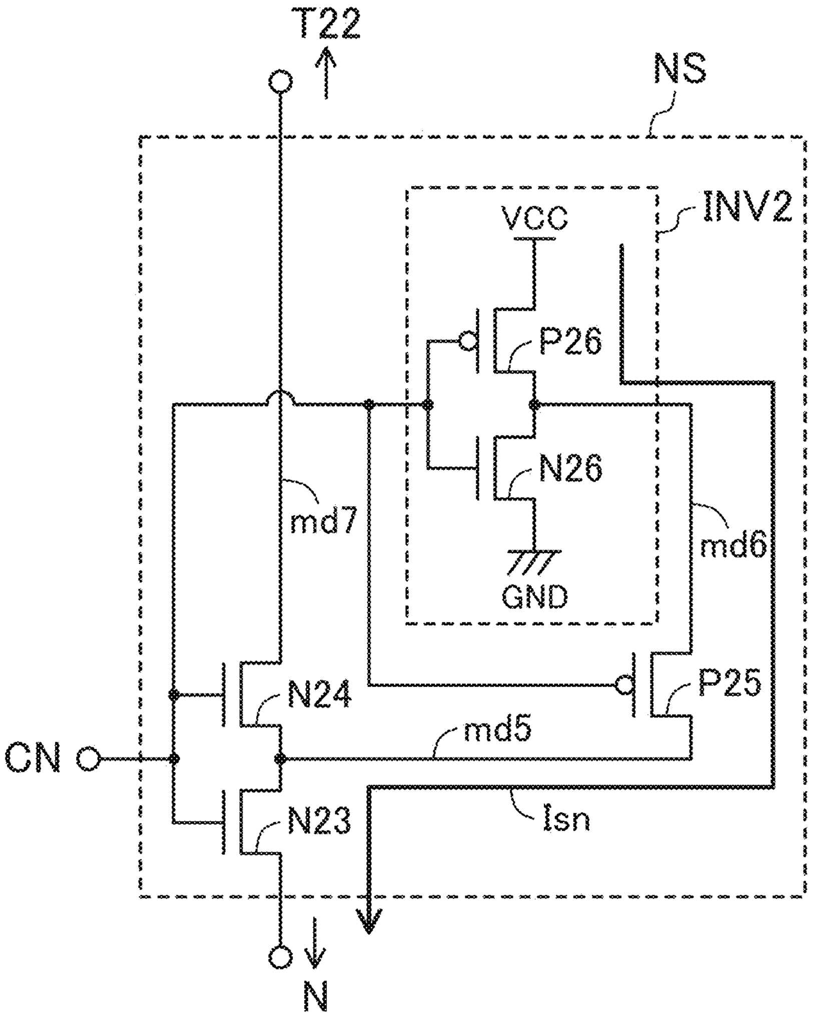
FIG. 3 is a circuit diagram showing a configuration example of a second switch circuit of a second current mirror circuit.

FIG. 3 is a circuit diagram showing a configuration example of a switch circuit NS, which can be used as the switch circuits NS1 to NS4 in FIG. 1. A switch control signal CN to control on/off of the switch circuit NS is given to the switch circuit NS.

To state specifically, as shown in FIG. 1, a switch control signal CN1 to control on/off of the switch circuit NS1 is given to the switch circuit NS1. Similarly, a switch control signal CN2 to control on/off of the switch circuit NS2 is given to the switch circuit NS2, a switch control signal CN3 to control on/off of the switch circuit NS3 is given to the switch circuit NS3, and a switch control signal CN4 to control on/off of the switch circuit NS4 is given to the switch circuit NS4. Note that, in the following description with reference to FIG. 3, the switch circuit is denoted by its common reference character NS, the second transistor is denoted by its common reference character N, and the switch control signal is denoted by its common reference character CN, for convenience sake.

As shown in FIG. 3, the switch circuit NS includes an n-type third transistor N23, an n-type fourth transistor N24, an inverter circuit INV2, and a p-type fifth transistor P25.

The third transistor N23 and the fourth transistor N24 are connected in series between the drain of the second transistor N and the output terminal T22. Specifically, one of the source and drain of the third transistor N23 is connected to the second transistor N, and the other is connected to a middle node md5. One of the source and drain of the fourth transistor N24 is connected to the middle node md5, and the other is connected to the output terminal T22. The switch control signal CN is given to the gates of the third and fourth transistors N23 and N24.

The inverter circuit INV2 has a configuration of a p-type transistor P26 and an n-type transistor N26 connected in series between the power supply VCC and the ground GND. The switch control signal CN is given to the input terminal of the inverter circuit INV2. In other words, the switch control signal CN is given to the gates of the transistors P26 and N26.

One of the drain and source of the fifth transistor P25 is connected to the output terminal of the inverter circuit INV2, and the other is connected to the middle node md5. In other words, one of the drain and source of the fifth transistor P25 is connected to the drains of the transistors P26 and N26. The switch control signal CN is given to the gate of the fifth transistor P25.

With the first current mirror circuit 10 and the second current mirror circuit 20 configured as described above, the output current Iout with respect to the input current Iin in the current mirror circuit 1 is expressed by Equation (5) below.

$$I\text{out}=I\text{in}\times\frac{\sum_{j=1}^{4}\left(NSj\times 2^{i-1}\right)}{\left(1+\sum_{i=2}^{4}\left(PSi\times 2^{i-1}\right)\right)} \quad (5)$$

In Equation (5), PSi is "1" when the switch circuit PS2, PS3, PS4 is on, and "0" when it is off. Also, NSj is "1" when the switch circuit NS1, NS2, NS3, NS4 is on, and "0" when it is off.

—Operation of Switch Circuit (1)—

Next, the operation of the switch circuit PS will be described with reference to FIG. 2.

<When Switch Circuit is On-Controlled>

First, the operation of the switch circuit PS when it is controlled to be on will be described.

When "L" is input as the switch control signal CP, the third transistor P13 and the fourth transistor P14 are turned on. With this, a desired current according to the size ratio between the second transistor P0 and the first transistor P flows from the first transistor P to the input terminal T11 through the switch circuit PS.

For example, when "L" is input as the switch control signal CP2 to turn on the switch circuit PS2, a desired current according to the size ratio between the second transistor P0 and the first transistor P2 flows from the first transistor P2 to the input terminal T11 through the switch circuit PS2 (see FIG. 1). This also applies to the switch circuits PS3 and PS4.

At this time, the fifth transistor N15 is turned off since "L" is input into its gate. Also, the output of the inverter circuit INV1 becomes "H". That is, the potential of a middle node md2 between the fifth transistor N15 and the output terminal of the inverter circuit INV1 is VCC, and the potential of the middle node md1 is an intermediate potential between VCC and GND.

In the above state, the middle-node md1 side of the fifth transistor N15 works as the source and the middle-node md2 side thereof works as the drain. The gate-source voltage Vgs of the fifth transistor N15 at this time is "Vgs=−Vmd1" where Vmd1 is the potential of the middle node md1. Since the potential of the middle node md1 is the intermediate potential between VCC and GND as described above, Vgs<<0, indicating that the fifth transistor N15 is in a deep reverse off state. Therefore, the leak current of the fifth transistor N15 can be kept low. That is, the influence of the leak current of the fifth transistor N15 on the current flowing from the first transistor P to the input terminal T11 can be kept low.

<When Switch Circuit is Off-Controlled>

Next, the operation of the switch circuit PS when it is controlled to be off will be described.

When "H" is input as the switch control signal CP, the third transistor P13 and the fourth transistor P14 are turned off. The fifth transistor N15 is turned on since "H" is input into its gate. Also, since "H" is input into the input terminal of the inverter circuit INV1, the transistor N16 is turned on. With this, the potential Vmd1 of the middle node md1 becomes "Vmd1≈GND." Since the potential of a node md3 connecting the fourth transistor P14 and the input terminal T11 becomes an intermediate potential between VCC and GND, the middle-node md1 side of the fourth transistor P14 works as the drain and the node md3 side thereof works as the source. The gate-source voltage Vgs of the fourth transistor P14 at this time is "Vgs=VCC−Vmd3" where Vmd3 is the potential of the node md3. Since the potential Vmd3 is the intermediate potential between VCC and GND as described above, Vgs>>0, indicating that the fourth transistor P14 is in a deep reverse off state. Therefore, the leak current of the fourth transistor P14 can be kept low.

Moreover, a leak current Isp flowing through the third transistor P13 flows to the ground GND through the fifth transistor N15 and the transistor N16 (see the arrow in FIG. 2). With this, it is possible to avoid the influence of the leak current Isp on the path of the input current Iin flowing to the input terminal T11. In other words, it is possible to prevent or reduce the error caused by the leak current Isp in the current ratio between the input current Iin and the middle current Imd as the output current.

—Operation of Switch Circuit (2)—

Next, the operation of the switch circuit NS will be described with reference to FIG. 3.

<When Switch Circuit is On-Controlled>

First, the operation of the switch circuit NS when it is controlled to be on will be described.

When "H" is input as the switch control signal CN, the third transistor N23 and the fourth transistor N24 are turned on. With this, a desired current according to the size ratio between the first transistor NO and the second transistor N flows from the second transistor N to the output terminal T22 through the switch circuit NS. For example, when "H" is input as the switch control signal CN1 to turn on the switch circuit NS1, a desired current according to the size ratio between the first transistor NO and the second transistor N1 flows from the second transistor N1 to the output terminal T22 through the switch circuit NS1 (see FIG. 1). This also applies to the switch circuits NS2 to NS4.

At this time, the fifth transistor P25 is turned off since "H" is input into its gate. Also, the output of the inverter circuit INV2 becomes "L". That is, the potential of a middle node md6 between the fifth transistor P25 and the output terminal of the inverter circuit INV2 is GND, and the potential of the middle node md5 is an intermediate potential between VCC and GND. In this state, the middle-node md5 side of the fifth transistor P25 works as the source and the middle-node md6 side thereof works as the drain. The gate-source voltage Vgs of the fifth transistor P25 at this time is "Vgs=VCC−Vmd5" where Vmd5 is the potential of the middle node md5. Since the potential of the middle node md5 is the intermediate potential between VCC and GND as described above, Vgs>>0, indicating that the fifth transistor P25 is in a deep reverse off state. Therefore, the leak current of the fifth transistor P25 can be kept low. That is, the influence of the leak current of the fifth transistor P25 on the current flowing from the second transistor N to the output terminal T22 can be kept low.

<When Switch Circuit is Off-Controlled>

Next, the operation of the switch circuit NS when it is controlled to be off will be described.

When "L" is input as the switch control signal CN, the third transistor N23 and the fourth transistor N24 are turned off. The fifth transistor P25 is turned on since "L" is input into its gate. Also, since "L" is input into the input terminal of the inverter circuit INV2, the transistor P26 is turned on. With this, the potential Vmd5 of the middle node md5 becomes "Vmd5≈VCC." Since the potential of a node md7 connecting the fourth transistor N24 and the output terminal T22 becomes an intermediate potential between VCC and GND, the middle-node md5 side of the fourth transistor N24 works as the drain and the node md7 side thereof works as the source. The gate-source voltage Vgs of the fourth transistor N24 at this time is "Vgs=−Vmd7" where Vmd7 is the potential of the node md7. Since the potential Vmd7 is the intermediate potential between VCC and GND as described above, Vgs<<0, indicating that the fourth transistor N24 is in a deep reverse off state. Therefore, the leak current of the fourth transistor N24 can be kept low.

Moreover, a leak current Isn flowing through the third transistor N23 flows from the power supply VCC to the second transistor N through the transistor P26 and the fifth transistor P25 (see the arrow in FIG. 3). With this, it is possible to avoid the influence of the leak current Isn on the path of the output current Iout flowing to the output terminal T22. In other words, it is possible to prevent or reduce the error caused by the leak current Isn in the current ratio between the middle current Imd as the input current and the output current Iout.

The current mirror circuit according to the present disclosure is highly useful since the error caused by an off-leak current can be prevented or reduced.

The invention claimed is:

1. A current mirror circuit, comprising:

an input terminal receiving an input current;

an output terminal from which an output current is output;

a plurality of first transistors of a first conductivity type, connected to a first power supply at their sources and to the input terminal at their gates and drains; and a second transistor of the first conductivity type, connected to the first power supply at its source, to the input terminal at its gate, and to the output terminal at its drain, wherein a switch circuit is provided between at least one of the plurality of first transistors and the input terminal, and the switch circuit includes a third transistor and a fourth transistor of the first conductivity type, connected in series between the drain of the first transistor and the input terminal, receiving a switch control signal for on/off control of the switch circuit at their gates, an inverter circuit receiving the switch control signal at its input terminal, and a fifth transistor of a second conductivity type, connected to an output terminal of the inverter circuit at one of its drain and source and to a middle node between the third transistor and the fourth transistor at the other of the drain and source, and receiving the switch control signal at its gate.

2. The current mirror circuit of claim 1, wherein the sizes of the plurality of first transistors are set according to binary weighting.

3. A current mirror circuit, comprising:

an input terminal receiving an input current;

an output terminal from which an output current is output;

a first transistor of a first conductivity type, connected to a first power supply at its source and to the input terminal at its gate and drain; and a plurality of second transistors of the first conductivity type, connected to the first power supply at their sources, to the input terminal at their gates, and to the output terminal at their drains, wherein a switch circuit is provided between at least one of the plurality of second transistors and the output terminal, and the switch circuit includes a third transistor and a fourth transistor of the first conductivity type, connected in series between the drain of the second transistor and the output terminal, receiving a switch control signal for on/off control of the switch circuit at their gates, an inverter circuit receiving the switch control signal at its input terminal, and a fifth transistor of a second conductivity type, connected to a middle node between the third transistor and the fourth transistor at one of its drain and source and to an output terminal of the inverter circuit at the other of the drain and source, and receiving the switch control signal at its gate.

4. The current mirror circuit of claim 3, wherein the sizes of the plurality of second transistors are set according to binary weighting.

* * * * *